United States Patent
Chan et al.

(10) Patent No.: US 8,948,720 B1
(45) Date of Patent: Feb. 3, 2015

(54) DETECTING AND HANDLING REGIONAL EVENTS BASED ON CALL ANALYSIS

(71) Applicant: Verizon Patent and Licensing Inc., Arlington, VA (US)

(72) Inventors: Yee Sin Chan, San Jose, CA (US); Lalit R. Kotecha, San Ramon, CA (US); Sagiv Draznin, Walnut Creek, CA (US); Arda Aksu, Martinez, CA (US); David Chiang, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/973,236

(22) Filed: Aug. 22, 2013

(51) Int. Cl.
| H04M 11/04 | (2006.01) |
|---|---|
| H04B 7/00 | (2006.01) |
| G08B 1/08 | (2006.01) |
| H04W 4/06 | (2009.01) |

(52) U.S. Cl.
CPC ..................................... H04W 4/06 (2013.01)
USPC .................... 455/404.1; 455/404.2; 455/521; 340/539.1; 340/539.11; 340/539.13

(58) Field of Classification Search
USPC .......................... 379/112.04, 112.01, 221.03; 340/539.13, 539.1, 539.11, 541, 573.1; 455/404.1, 456.1, 521, 445, 404.2, 455/507, 422.1, 512
See application file for complete search history.

(56) References Cited

U.S. PATENT DOCUMENTS

| 7,817,789 | B2 * | 10/2010 | Ferguson et al. | 379/112.04 |
|---|---|---|---|---|
| 8,013,734 | B2 * | 9/2011 | Saigh et al. | 340/539.13 |
| 8,219,110 | B1 * | 7/2012 | White et al. | 455/456.1 |
| 8,521,123 | B2 * | 8/2013 | Cook et al. | 455/404.1 |
| 8,624,727 | B2 * | 1/2014 | Saigh et al. | 340/539.13 |
| 8,665,089 | B2 * | 3/2014 | Saigh et al. | 340/539.13 |
| 2003/0050039 | A1 * | 3/2003 | Baba et al. | 455/404 |
| 2005/0085257 | A1 * | 4/2005 | Laird et al. | 455/550.1 |
| 2008/0070546 | A1 * | 3/2008 | Lee | 455/404.2 |
| 2010/0227581 | A1 * | 9/2010 | Cook et al. | 455/404.1 |
| 2010/0267391 | A1 * | 10/2010 | Schmitt | 455/445 |
| 2011/0117878 | A1 * | 5/2011 | Barash et al. | 455/404.2 |
| 2012/0200411 | A1 * | 8/2012 | Best | 340/539.13 |
| 2013/0052983 | A1 * | 2/2013 | Fletcher et al. | 455/404.2 |
| 2013/0052984 | A1 * | 2/2013 | Mohler et al. | 455/404.2 |
| 2013/0183924 | A1 * | 7/2013 | Saigh et al. | 455/404.2 |

\* cited by examiner

*Primary Examiner* — Binh Tieu

(57) ABSTRACT

A server device may be configured to receive information regarding calls that have been placed; detect, based on the information regarding the calls that have been placed, an occurrence of an event; determine a set of base stations that are associated with the event; and broadcast, via the set of base stations, a message regarding the event.

20 Claims, 10 Drawing Sheets

400

| Location | Timestamp | Call recipient | Call topic(s) |
|---|---|---|---|
| BS 310-1 | 3:00:00 PM | 911 | Tornado |
| BS 310-1 | 3:01:00 PM | 911 | Tornado |
| BS 310-1 | 3:01:05 PM | 911 | Tornado |
| BS 310-2 | 3:03:00 PM | 555-555-5555 | |
| 38.897531, -77.036967 | 3:05:00 PM | 123-555-4321 | |
| BS 310-1 | 3:05:00 PM | 911 | |
| BS 310-2 | 3:05:00 PM | 911 | Tornado, Flood |

DETECTING AND HANDLING REGIONAL EVENTS BASED ON CALL ANALYSIS

BACKGROUND

When emergency events occur, callers may call emergency services (e.g., by dialing "9-1-1" on their telephones). In some circumstances, enough callers may call regarding the same event that telephone networks may become overloaded. Furthermore, emergency resources, such as emergency telephone operators, may be inefficiently utilized by answering numerous calls regarding the same emergency event.

DETAILED DESCRIPTION OF PREFERRED EMBODIMENTS

The following detailed description refers to the accompanying drawings. The same reference numbers in different drawings may identify the same or similar elements.

Figure 1:
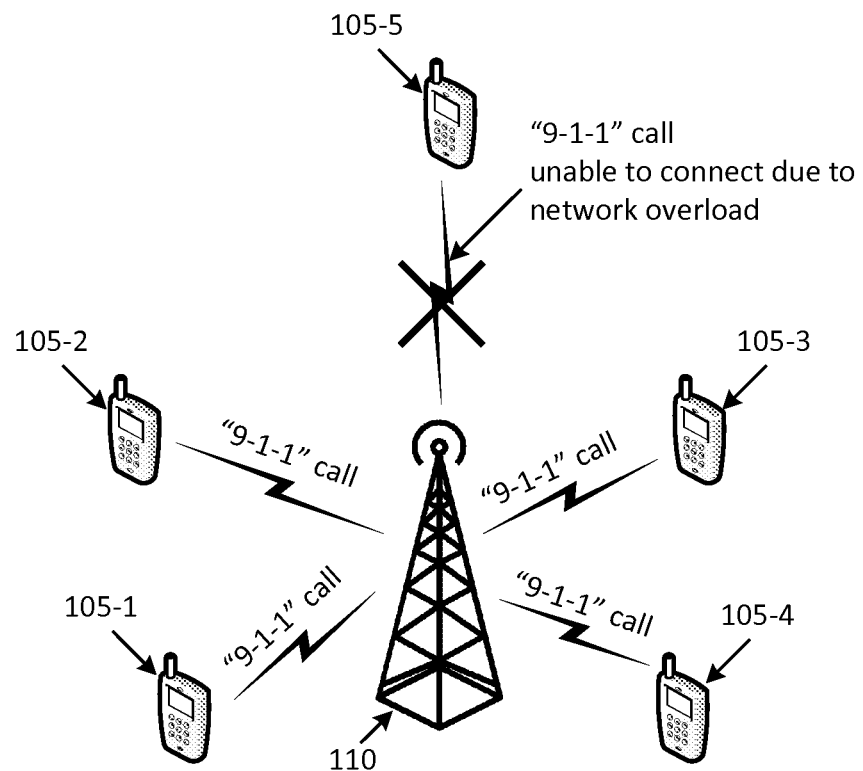
FIG. 1 illustrates a potential situation that may occur when numerous calls are made at the same time.

Techniques described herein may allow for the detection and handling of calls or other network traffic, based on regional or localized events. For example, as shown in FIG. 1, a set of user devices 105-1 through 105-5 (hereinafter referred to collectively as "user devices 105," or individually as "user device 105") may be in communication with base station 110, which may be a base station associated with a wireless telecommunications network. As shown, user devices 105-1 through 105-4 may have placed an emergency call (shown in the figure as "9-1-1 call"). For example, an emergency event (such as a natural disaster, an auto accident, a bank robbery, etc.) may have occurred in a geographical region that is proximal to user devices 105-1 through 105-4, and users of these user devices may have placed a call to report the emergency and/or to request aid.

In some situations, such as the example shown in FIG. 1, excessive call traffic may overload a telecommunications network, thus preventing some calls from being able to be placed. For instance, as shown, a user of user device 105-5 may attempt to place a call (e.g., an emergency call), but the call may not be able to be placed due to overload of the network. Thus, an undesirable situation may occur in which redundant emergency calls regarding the same topic may be placed, while other, potentially urgent, calls may be neglected. Further, in such situations, emergency resources (e.g., emergency operators at an emergency call center) may be wasted by numerous calls regarding the same topic. Additionally, network resources (e.g., network bandwidth) may be wasted by these redundant calls.

Figure 2A:
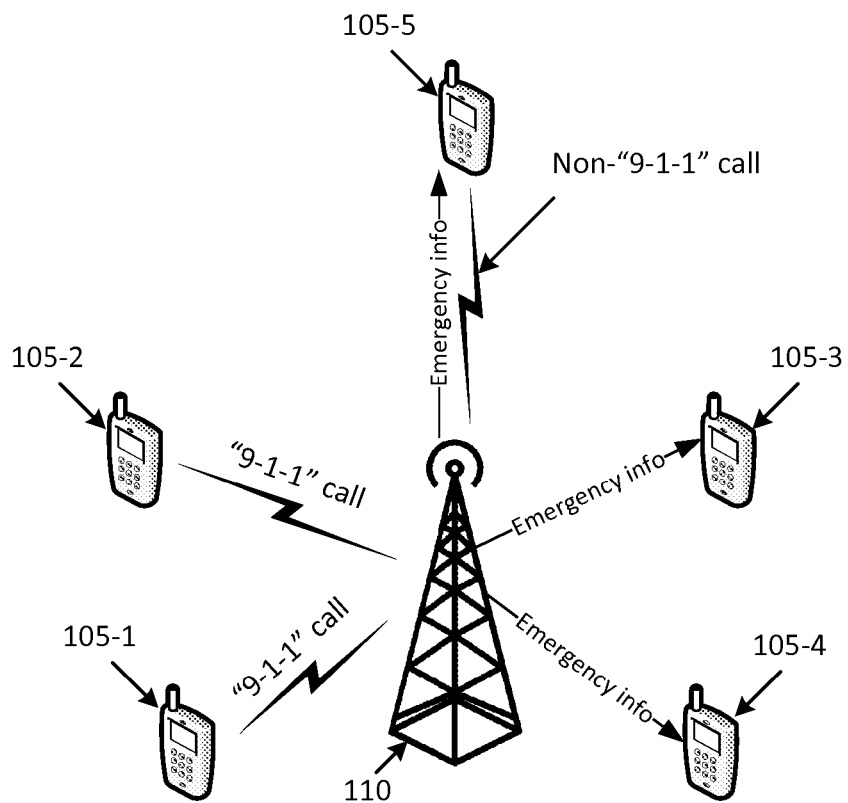
FIGS. 2A and 2B illustrate an example overview of one or more implementations described herein.
Figure 2B:
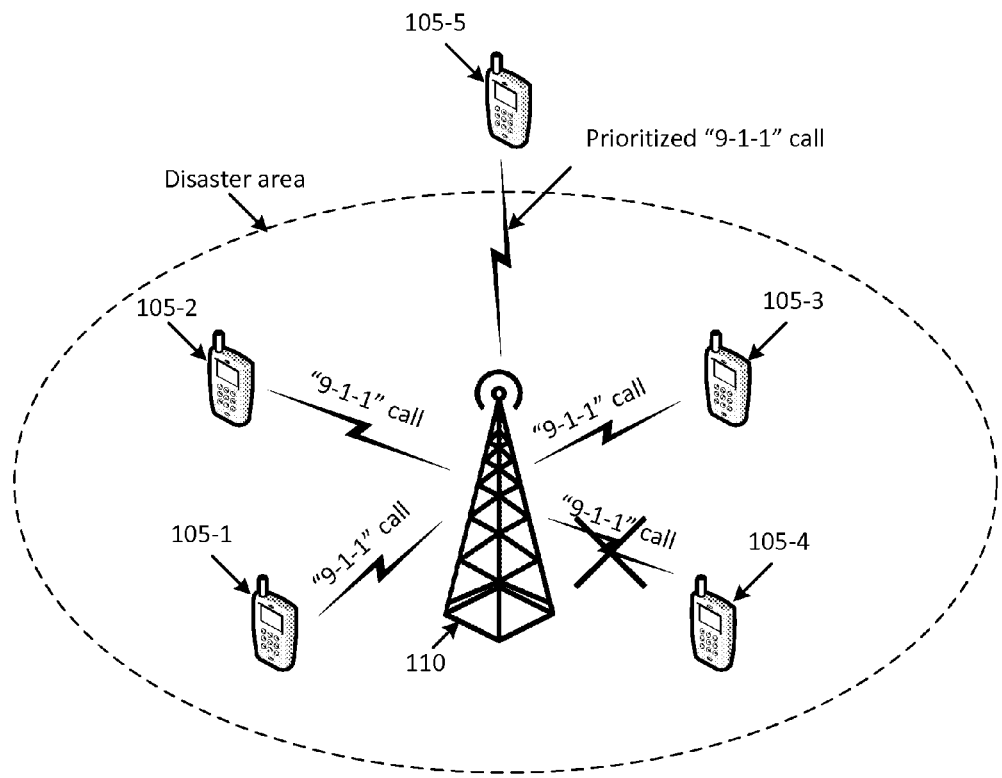

FIGS. 2A and 2B illustrate an example overview of one or more implementations, in which situations described above with respect to FIG. 1 may be alleviated. For instance, as shown in FIG. 2A, assume that user devices 105-1 and 105-2 place emergency calls in a relatively short timeframe. According to some implementations, based on these calls, an emergency event may be detected. Based on detecting the emergency event, a message (shown in the figure as "Emergency info") may be broadcasted to other user devices 105 that are associated with base station 110 (e.g., user devices 105-3 through 105-5). Based on these messages, users of user devices 105-3 through 105-5 may be notified that the emergency situation has been acknowledged, and that it is unnecessary to place an emergency call.

Thus, network resources may be conserved, which may further allow other calls to be made. For instance, as further shown in FIG. 2A, since the network is not overloaded, user device 105-5 may be able to place a call (e.g., a non-emergency call, or in some situations, an emergency call) that would not otherwise have been able to be placed, according to the example shown in FIG. 1. Additionally, broadcasting messages may consume a smaller amount of network resources than multiple different calls, as broadcasting a message may involve fewer resources, such as fewer radio resources, involved in individually implementing multiple calls. In addition to conserving network resources, broadcasting emergency messages may enhance users' safety, as relevant, up-to-date information may be provided, that is based on real-time user activity (e.g., nearby emergency phone calls that are being placed).

As shown in FIG. 2B, detecting an emergency event may also allow calls to be prioritized, such that redundant calls do not supersede other calls. For example, user devices 105-1 through 105-3 may place emergency calls within a relatively short timeframe. Based on these calls, an emergency event may be detected. As shown in FIG. 2B, user devices 105-1 through 105-3 may be within a detected disaster area. This disaster area may have been identified, at least in part, based on the calls received from user devices 105-1 through 105-3.

As further shown, user device 105-4 may also place an emergency call, and user device 105-5 may also place an emergency call. Assume that the calls placed by user devices 105-4 and 105-5 are placed at nearly the same time, such that call initiation processing for these calls occurs concurrently. User device 105-4 may be identified as being within the disaster area, and user device 105-5 may be identified as being outside of the disaster area.

The non-emergency call from user device 105-5 may be prioritized ahead of the emergency call from user device 105-4, by virtue of the fact that several other emergency calls have already been received, from within the disaster area, via base station 110. Thus, in some situations, such as the one shown in FIG. 2B, the call from user device 105-5 may be connected, while the call from user device 105-4 may not be able to be placed (e.g., due to overloaded network resources).

Since multiple calls to the same call recipient, within a relatively short timeframe and within a relatively confined area may be likely to be regarding the same topic, there may be little benefit in allowing those calls to be placed. Thus, by prioritizing other calls that are not related to this topic (e.g., calls from a different region, and/or calls to a different recipient), overall system efficiency may be enhanced.

Figure 3A:
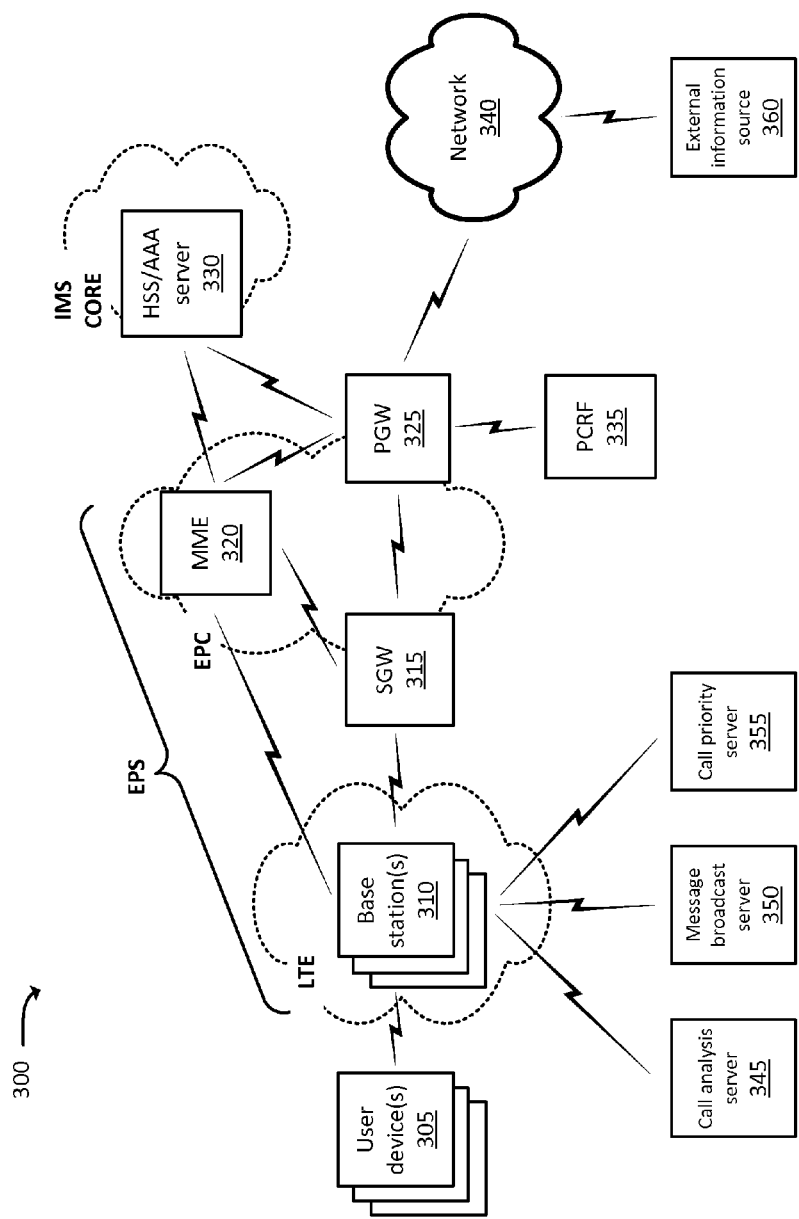
FIG. 3A illustrates an example environment in which systems and/or methods, described herein, may be implemented.

FIG. 3A illustrates an example environment 300, in which systems and/or methods described herein may be implemented. As shown in FIG. 3A, environment 300 may include one or more user devices (referred to collectively as "user devices 305," or individually as "user device 305"), one or more base stations (referred to collectively as "base stations 310," or individually as "base station 310") serving gateway ("SGW") 315, mobility management entity device ("MME") 320, packet data network ("PDN") gateway ("PGW") 325, home subscriber server ("HSS")/authentication, authorization, accounting ("AAA") server 330 (hereinafter referred to as "HSS/AAA server 330"), policy charging and rules function ("PCRF") 335, network 340, call analysis server 345, message broadcast server 350, call priority server 355, and external information source 360.

The quantity of devices and/or networks, illustrated in FIG. 3A, is provided for explanatory purposes only. In practice, there may be additional devices and/or networks; fewer devices and/or networks; different devices and/or networks; or differently arranged devices and/or networks than illustrated in FIG. 3A. Alternatively, or additionally, one or more of the devices of environment 300 may perform one or more functions described as being performed by another one or more of the devices of environment 300. Devices of environment 300 may interconnect via wired connections, wireless connections, or a combination of wired and wireless connections.

Environment 300 may include an evolved packet system ("EPS") that includes a long term evolution ("LTE") network and/or an evolved packet core ("EPC") network that operate based on a third generation partnership project ("3GPP") wireless communication standard. The LTE network may be, or may include, a RAN that includes one or more base stations 310, some or all of which, take the form of an eNodeB ("eNB"), via which user device 305 may communicate with the EPC network. The EPC network may include one or more SGWs 315, MMEs 320, and/or PGWs 325, and may enable user device 305 to communicate with network 340 and/or an Internet protocol ("IP") multimedia subsystem ("IMS") core network. The IMS core network may include HSS/AAA server 330, and may manage authentication, session initiation, account information, a user profile, etc. associated with user device 305.

User device 305 may include any computation and communication device, such as a wireless mobile communication device that is capable of communicating with one or more networks (e.g., network 340 and/or the IMS core). For example, user device 305 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a personal gaming system, or another type of mobile computation and communication device. User device 305 may send traffic to and/or receive traffic from network 340 via signal bearers, such as base station 310, SGW 315, and/or PGW 325.

Base station 310 may include one or more network devices that receive, process, and/or transmit traffic, such as calls, audio, video, text, and/or other data, destined for and/or received from user device 305. In one example, base station 310 may be an eNB device and may be part of the LTE network. Base station 310 may receive traffic from and/or send traffic to network 340 via SGW 315 and PGW 325. Base station 310 may send traffic to and/or receive traffic from user device 305 via an air interface.

SGW 315 may include one or more network devices that gather, process, search, store, and/or provide information. For example, SGW 315 may include a gateway, a router, a modem, a switch, a firewall, a network interface card ("NIC"), a hub, a bridge, a proxy server, or some other type of device that processes and/or transfers traffic. SGW 315 may, for example, aggregate traffic received from one or more base stations 310 and may send the aggregated traffic to network 340 via PGW 325.

MME 320 may include one or more computation and communication devices that gather, process, search, store, and/or provide information. For example, MME 320 may perform operations to register user device 305 with the EPS, to establish bearer channels associated with a session with user device 305, to hand off user device 305 from the EPS to another network, to hand off user device 305 from the other network to the EPS, and/or to perform other operations. MME 320 may perform policing operations on traffic destined for and/or received from user device 305.

PGW 325 may include one or more network devices, or other types of computation and communication devices, that gather, process, search, store, and/or provide information in a manner described herein. For example, PGW 325 may include a gateway, a router, a modem, a switch, a firewall, a network interface card ("NIC"), a hub, a bridge, a proxy server, an optical add-drop multiplexer ("OADM"), and/or some other type of device that processes and/or transfers traffic. PGW 325 may aggregate traffic received from one or more SGWs 315, and may send the aggregated traffic to network 340. PGW 325 may also, or alternatively, receive traffic from network 340 and may send the traffic toward user device 305 via SGW 315, and/or base station 310.

HSS/AAA server 330 may include one or more server devices, or other types of devices, that gather, process, search, store, and/or provide information. For example, HSS/AAA server 330 may manage, update, and/or store, in a memory associated with HSS/AAA server 330, profile information associated with a subscriber. The profile information may identify applications and/or services that are permitted for and/or accessible by the subscriber; a mobile directory number ("MDN") associated with the subscriber; bandwidth or data rate thresholds associated with the applications and/or services; information associated with the subscriber (e.g., a username, a password, etc.); rate information; minutes allowed for a subscriber; and/or other information. The subscriber may be associated with user device 305 and/or one or more other user devices 305. Additionally, or alternatively, HSS/AAA server 330 may perform authentication, authorization, and/or accounting operations associated with the subscriber and/or a communication session with user device 305.

PCRF 335 may include one or more server devices, or other types of devices, that aggregate information to and from the EPC network and/or other sources. PCRF 335 may receive information regarding policies and/or subscriptions from one or more sources, such as subscriber databases and/or from one or more users (such as, for example, an administrator associated with PCRF 335).

Network 340 may include one or more wired and/or wireless networks. For example, network 340 may include a cellular network, a public land mobile network ("PLMN"), a second generation ("2G") network, a third generation ("3G") network, a fourth generation ("4G") network, a fifth generation ("5G") network, and/or another network. Additionally, or alternatively, network 340 may include a wide area network ("WAN"), a metropolitan area network ("MAN"), a telephone network (e.g., the Public Switched Telephone Network ("PSTN")), an ad hoc network, an intranet, PDN (e.g., the Internet), a fiber optic-based network, and/or a combination of these or other types of networks.

In some implementations, some or all of network 340 may be provided by one or more cellular network providers. That is, in some such implementations, network devices within, or associated with, network 340, may be provided by the one or more cellular network providers. In some implementations, network 340 may be communicatively coupled to one or more other networks, such as the Internet.

Call analysis server 345 may include one or more server devices, which may receive information regarding calls that have been placed (such as calls placed by user devices 305). As described further below, the information may include, for instance, information regarding locations of user devices 305 from which calls have been placed, information regarding base stations 310 via which calls have been placed, timestamps indicating when calls have been placed, topics of calls that have been placed, and/or other information. Call analysis server 345 may also, as additionally described below, determine, based on call information, when events have occurred. In some implementations, call priority server 355 may additionally, or alternatively, make these determinations based on information received from external information source 360. This information may include, for example, news, weather, traffic, or other types of information which may aid in determining when an event has occurred.

Message broadcast server 350 may include one or more server devices, which may broadcast messages to multiple user devices 305. In some implementations, message broadcast server 350 may broadcast messages based on events detected by call analysis server 345. A more detailed example of message broadcast server 350, in accordance with some implementations, is described below with respect to FIG. 3B. In some implementations, message broadcast server 350 may implement a Multimedia Broadcast Multicast Services ("MBMS") standard (e.g., as standardized by the Third Generation Partnership Project ("3GPP")), an Evolved MBMS ("eMBMS") standard, a Cell Broadcast Service ("CBS") standard (e.g., as standardized by the 3GPP), and/or another methodology of broadcasting messages or other content.

Call priority server 355 may include one or more server devices, which may determine a priority in which calls should be handled. In some implementations, call priority server 355 may determine quality of service ("QoS") levels to apply to certain calls, and/or an order in which calls or call traffic should be processed. In some implementations, call priority server 355 may make these determinations in whole or in part based on call analysis performed by call analysis server 345.

External information source 360 may include one or more server devices, which identify and/or receive information, such as news, weather, traffic, or other types of information. For instance, external information source 360 may include, or communicate with, a web server that receives and/or stores content provided by content providers (e.g., news organizations, weather organizations, etc.). In some implementations, external information source 360 may output the information to call analysis server 345 (e.g., via network 340).

Figure 3B:
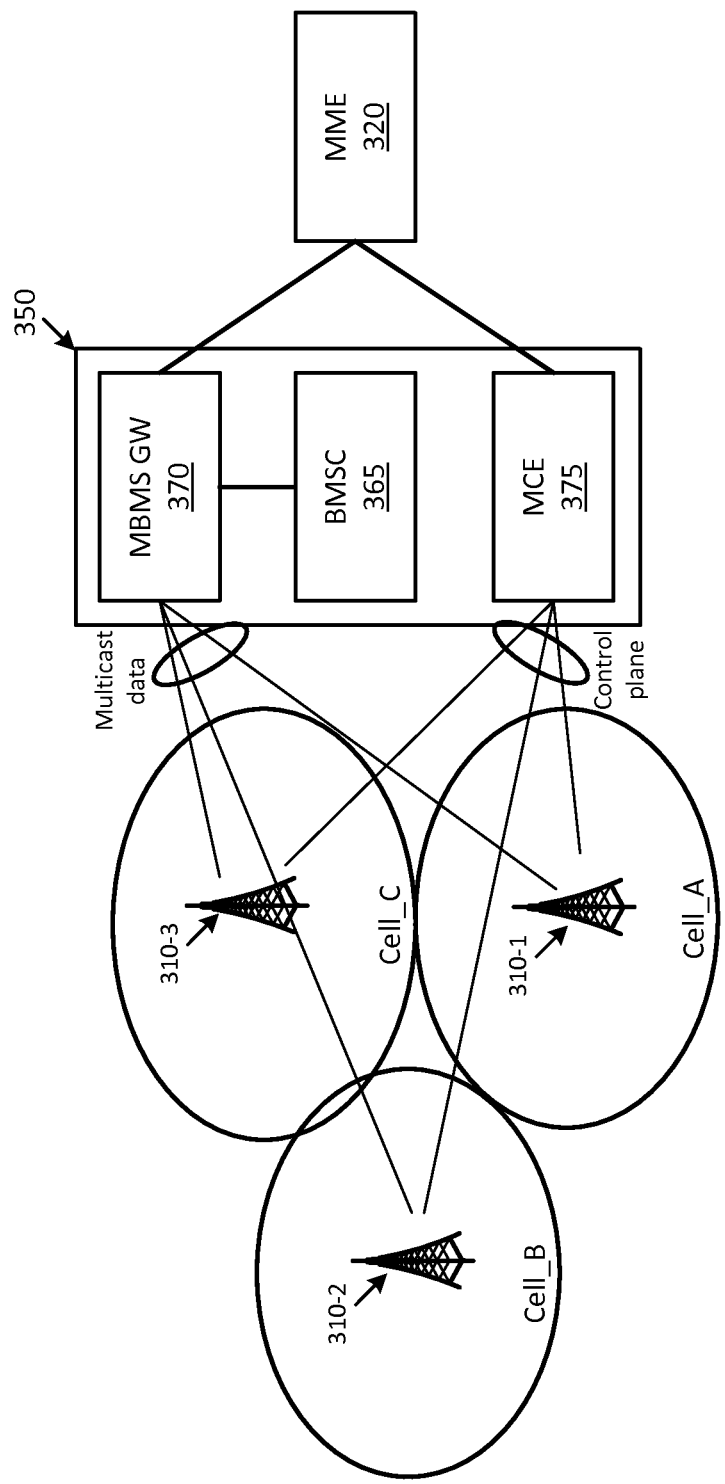
FIG. 3B illustrates an alternate view of some components of an environment in which systems and/or methods, described herein, may be implemented.

FIG. 3B illustrates some components of environment 300 in additional detail. As shown in FIG. 3B, message broadcast server 350 may include multicast service center ("BMSC") 375, MBMS Gateway ("MBMS GW") 370, and Multi-cell/multicast Coordination Entity ("MCE") 375. In the example shown in FIG. 3B, message broadcast server 350 may be in communication with base stations 310-1 through 310-3, each of which may be associated with a respective coverage area, or "cell" (shown in the figure as "Cell_A," "Cell_B," and "Cell_C").

BMSC 365 may include one or more computation or communication devices that provide for the coordination of multicast using MBMS, eMBMS, CBS, and/or another broadcast technique. BMSC 365 may perform functions relating to authorization, charging, and assignment of communication channels. For example, BMSC 365 may assign a particular quantity of multicast data channels for various multicast content streams. BMSC 365 may also receive content (e.g., a message regarding a detected event) for broadcast transmission, and may forward the received content as part of a multicast transmission.

MBMS GW 370 may include one or more computation and communication devices that provide for the coordination of the sending of multicast data (e.g., IP multicast packets) to base stations 310. MBMS GW 370 may receive the content, which is to be broadcasted, from BMSC 365. As illustrated, MBMS GW 370 may transmit MBMS data plane traffic ("Multicast data") to base stations 310.

As mentioned above, MME 320 may perform policing operations on traffic destined for and/or received from user device 305. MME 320 may, in some implementations, aid in the control signaling necessary for messages to be broadcasted to user devices 305 associated with base stations 310.

MCE 375 may include one or more computation and communication devices that may perform admission control, allocation of radio resources throughout a Multimedia Broadcast Multicast Service Single Frequency Network ("MBSFN") area, MBMS session control signaling, and make decisions on radio configurations. As illustrated, MCE 375 may transmit MBMS control plane traffic ("Control plane") to base stations 310.

In eMBMS, cells associated with base stations 310 may be grouped to obtain MBSFN areas. Multicast data channels in an MBSFN area may be synchronized so that identical multicast radio signals may be generated, at the same time, for multiple cells. For example, MBSFN areas may be defined that cover the area associated with multiple ones of the illustrated cells. One example MBSFN area may correspond to the area covered by Cell_A and Cell_B. A multicast data channel, transmitted in the MBSFN area, may include radio signals that are synchronized in Cell_A and Cell_B.

Figure 4:
FIG. 4 illustrates an example data structure that may be utilized by one or more devices of some implementations described herein.

FIG. 4 illustrates an example data structure 400, which may be stored by, for example, call analysis server 345. Data structure 400 may include information regarding placed phone calls. As described further below, call analysis server 345 may use the information stored in data structure 400 when determining whether an event has occurred. The information may be received from base stations 310, network 340, and/or another device. For instance, in some implementations, some or all of the information stored in data structure 400 may be received from computing device associated with an administrator and/or another user, and may be information that has been manually provided by the administrator and/or another user.

As shown, data structure 400 may include information regarding the location from which a phone call was placed, a timestamp associated with the phone call, an intended recipient of the phone call, and/or a topic associated with the phone call. The location information, stored in data structure 400, may indicate a particular base station 310, via which a call was placed. The information may include, for example, an identifier associated with the base station. In some implementations, the location information may indicate a geographical location (e.g., a set of latitude and longitude coordinates) associated with a particular base station 310, or a particular user device 305 from which the call was placed.

The call recipient information may include an identifier associated with intended recipients of calls. This information may include, for example, a mobile directory number ("MDN"), a PSTN telephone number, an International Mobile Station Equipment Identity ("IMEI"), an International Mobile Subscriber Identity ("IMSI"), and/or another device identifier. Additionally, or alternatively, the call recipient information may include a user name, a description, and/or other information regarding an entity to which a call is directed.

The call topic information may include, for example, one or more keywords regarding a call. The call topic information may be received from, for example, a user, such as a user who places the call or a user who receives the call. For instance, assume that a particular call is an emergency call (e.g., a "9-1-1" call) to a Public Safety Answering Point ("PSAP"). An operator at the PSAP may input, via computer device, a topic of the call, and call analysis server 345 may receive and store this topic information. In some implementations, the topic and/or topics of a call may be determined in another way (e.g., by an automated voice analysis device).

As shown in FIG. 4, topic information may not be stored for some calls. Such a situation may occur when a caller or recipient does not desire to provide a topic, when a caller or recipient does is not able to provide a topic, and/or when call analysis server 345 is not configured to receive or store such information.

In some implementations, although not shown, data structure 400 may store information regarding callers, from which calls are received. For instance, data structure 400 may store MDNs, PSTN telephone numbers, or other information regarding callers. In some implementations, data structure 400 may store information regarding only up to a particular quantity of calls from a particular caller. For instance, data structure 400 may only store information regarding the most recent call by a particular caller, the most recent ten calls by the particular caller, and/or calls that correspond to the last hour, day, week, and/or other period of time.

Figure 5:
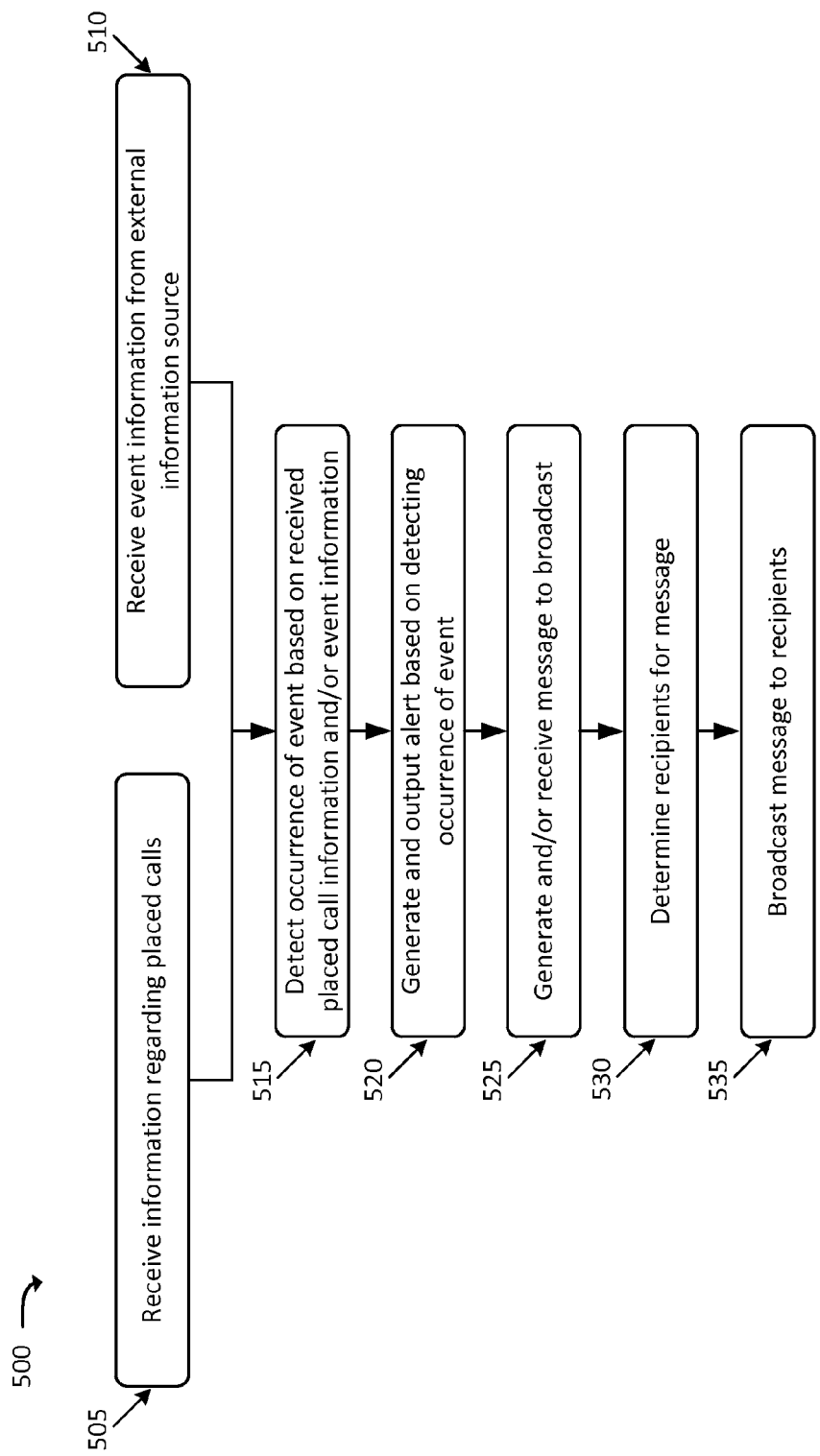
FIG. 5 illustrates an example process for broadcasting a message regarding a detected event.

FIG. 5 illustrates an example process 500 for detecting an event, and broadcasting a message regarding the detected event. In one example implementation, process 500 may be performed by call analysis server 345. In other implementations, some or all of process 500 may be performed by one or more other devices in lieu of, or in conjunction with, call analysis server 345. For example, some or all of process 500 may be performed by message broadcast server 350 in some implementations.

Process 500 may include receiving information regarding placed calls (block 505). For example, as described above, call analysis server 345 may receive information regarding placed calls from one or more base stations 310, network 340, and/or from another source. In some implementations, call analysis server 345 may receive (at block 505) the information in real time or near-real time (e.g., as a call is placed, information regarding the call may be provided to call analysis server 345). In some implementations, call analysis server 345 may receive (at block 505) the information on a periodic basis (e.g., every minute, every fifteen minutes, every hour, etc.). In some implementations, call analysis server 345 may receive (at block 505) the information on an otherwise intermittent basis (e.g., when network bandwidth is available for the information to be provided to call analysis server 345).

In some implementations, call analysis server 345 may store (at block 505) information regarding only a particular set of call recipients. For example, in some such implementations, call analysis server 345 may store only call information regarding calls to a PSAP (e.g., "9-1-1" calls). In other implementations, call analysis server 345 may store information regarding additional, or all, call recipients.

Process 500 may also include receiving event information from an external information source (block 510). For example, as mentioned above, call analysis server 345 may receive news, traffic, weather, and/or other types of information from, for example, external information source 360.

Process 500 may additionally include detecting an occurrence of an event based on the received placed call information and/or the received event information (block 515). For example, call analysis server 345 may detect an event based on a relatively large number of calls being placed, within a relatively small area, within a relatively short period of time. In some implementations, the detection may be based on calls that are made to a particular recipient. For instance, in some such implementations, if a relatively large number of calls are made, but to various recipients, an event may not be detected. If, on the other hand, a relatively large number of calls are made to one recipient (e.g., to a PSAP), an event may be detected.

In other words, call analysis server 345 may, in some implementations, detect an event based on a frequency and/or volume of calls, and/or based on locations at which calls are placed. In some implementations, if the quantity or frequency of calls exceeds a threshold quantity or frequency, an event may be detected. In some implementations, the detection may further be a function of the area, regions, and/or base stations 310, associated with the calls. For instance, in some such implementations, the threshold quantity or frequency may be lower when the locations, from which calls are received, cover a larger area or involve more base stations 310, compared to the threshold quantity or frequency when the locations, from which calls are received, cover a smaller area or involve fewer base stations 310.

As mentioned above, the detection of the occurrence of an event may be further based on information received from external information source 360. For example, assume that a relatively small number of emergency calls are received within a particular timeframe, via a particular base station 310. Further assume that information, received from external information source 360, indicates that a tornado has occurred at a geographic location near the particular base station 310. Even though the call frequency alone may not indicate that an event has occurred, call analysis server 345 may detect an event based on additional information received from external information source 360.

In some implementations, call analysis server 345 may apply a weighting factor to call information based on information received (at block 510) from external information source 360. For example, if information received from external information source 360 indicates a potential emergency situation, call analysis server 345 may multiply the number of calls, indicated in the information received at block 505, by a weighting factor (e.g., 1.2, 1.5, or some other weighting factor). In some implementations, the weighting factor may be applied based on the severity of the event(s) indicated in the information received from external information source 360. For instance, a car accident may be associated with a lower weighting factor than a tornado.

When detecting (at block 515) the occurrence of an event, call analysis server 345 may utilize information regarding the topics of calls that are placed (e.g., as stored in data structure 400). For instance, a large number or a high frequency of calls regarding a particular topic (even if placed to different recipients) may indicate the occurrence of an event. In this sense, topic information may be used in addition to other types of information when detecting the occurrence of an event.

Process 500 may further include generating and outputting an alert based on detecting the occurrence of the event (block 520). For instance, call analysis server 345 may generate an alert that includes the rationale for why an event was detected (e.g., some or all of the contents of data structure 400, call frequency and/or volume, a summary of a location or locations from which relevant calls were received, information indicating one or more thresholds that were exceeded by call frequency and/or volume, etc.). Call analysis server 345 may output the alert to message broadcast server 350 and/or another device (e.g., a computer device associated with an administrator and/or another user).

Process 500 may also include generating and/or receiving a message to broadcast (block 525). For instance, call analysis server 345 may automatically generate a message, based on the detected event. For instance, the generated message may indicate that a high volume of calls are being placed for a particular number, may include topic information for an event detected at block 520, and/or may include information received from external information source 360 regarding the event. In some implementations, the message may partially, or entirely, include information received from a user (e.g., an administrator). For example, an administrator may generate a message, such as "We are aware of the tornado, and are sending help. In the meantime, stay indoors away from windows."

Process 500 may additionally include determining recipients for the message (block 530). For example, call analysis server 345 may determine a region to which the message (generated or received at block 525) should be broadcasted. In some implementations, call analysis server 345 may determine one or more base stations, to which the message should be broadcasted. In some implementations, call analysis server may determine a set of user devices 305 to which the message should be broadcasted.

Figure 6:
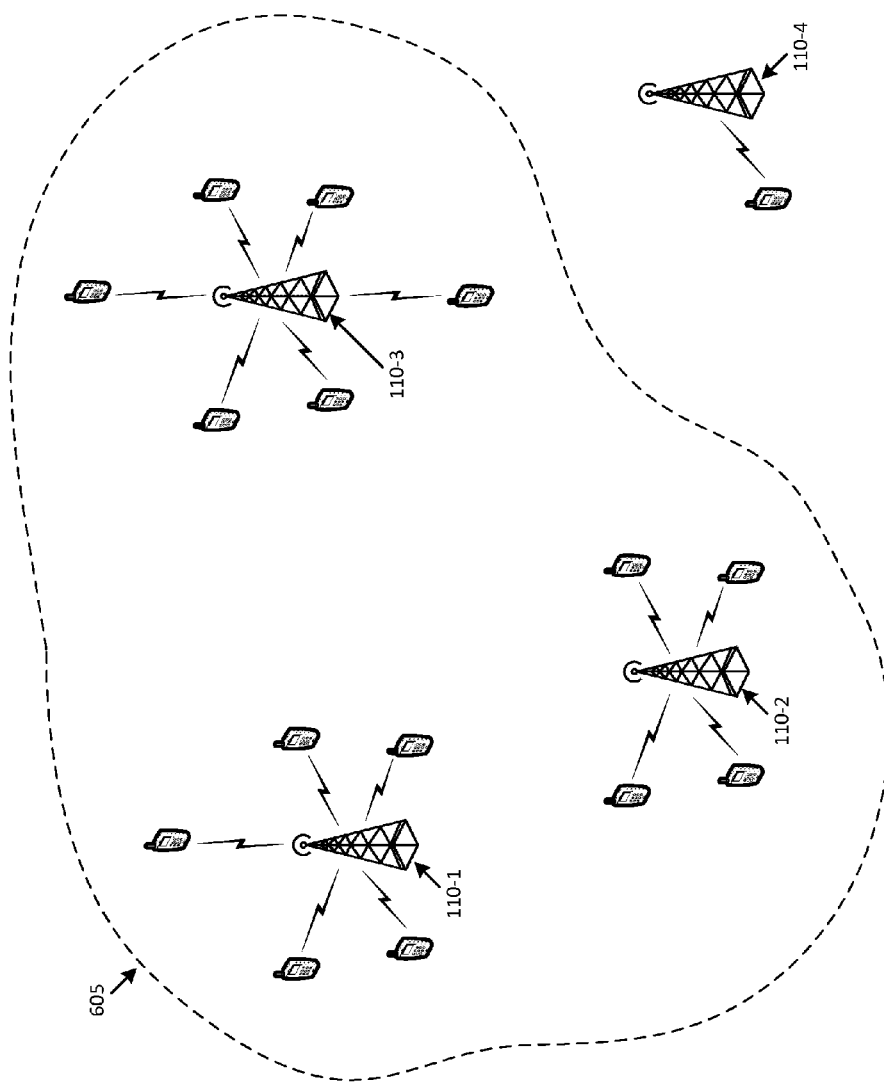
FIG. 6 conceptually illustrates the determination of a broadcast area based on a detected event.

Call analysis server 345 may base this determination on, for example, locations from which a high volume or frequency of calls were received within a particular timeframe. FIG. 6 illustrates an example situation, in which call analysis server 345 may determine an area within which the message should be broadcasted. For example, as shown in FIG. 6, assume that a relatively large volume of "9-1-1" calls are received via base stations 110-1 through 110-3, and that a relatively large volume of "9-1-1" calls are not received via base station 110-4. In this situation, call analysis server 345 may determine that the message should be broadcasted to user devices 105 that are attached to base stations 110-1 through 110-3.

As another example and still referring to FIG. 6, call analysis server 345 may additionally, or alternatively, determine that a relatively large number of calls were received from a relatively concentrated geographic area (shown in FIG. 6 as area 605). In some implementations, call analysis server 345 may identify base stations 110 within geographic area 605, and may determine that the message should be broadcasted to user devices 105 attached to those identified base stations.

Returning to FIG. 5, process 500 may further include broadcasting the message to the recipients (block 535). For example, call analysis server 345 may output the message to message broadcast server 350, with information identifying the intended recipients (e.g., identifiers of one or more base stations 310 or MBSFN areas) of the message. Message broadcast server 350 may broadcast, or aid in broadcasting, the message (e.g., by sending the message to the identified base station(s) 310, which may in turn broadcast the message to attached user devices 305). As mentioned above, the broadcasting may be performed according to an MBMS standard, an eMBMS standard, or using another technique. In some implementations, the message (broadcasted to user devices 305) may be a short message service ("SMS") message, a multimedia messaging service ("MMS") message, an email, and/or another type of message.

In some implementations, the broadcasting (at block 535) may include communicating with an application that is running on user devices 305, which may display the broadcasted message. In some implementations, the application running on user device 305 may analyze the message and determine whether the message should be displayed or discarded. For instance, the application may determine that the message indicates that an emergency is occurring, and that a user of user device 305 should not feel the need to dial "9-1-1." The application may further determine that the user has already dialed "9-1-1" previously (e.g., within a predetermined period of time before the message is received by user device 305). Based on determining that the user has already dialed "9-1-1," the application may forgo presenting the broadcasted message, and may instead store and/or discard the message without presenting the message.

In some implementations, the message may include conditions (e.g., service level conditions), which may dictate, for example, which user devices 305 display the broadcasted message. For instance, the message may include an area code (or set of area codes) of telephone numbers. A particular user device 305 may receive the message and determine whether a telephone number, associated with the particular user device 305, matches the area code (or falls within the set of area codes) indicated by the message. Based on this determination, user device 305 may determine whether the message should be presented. In some implementations, the message may include additional, or different conditions, which may be analyzed by user devices 305 individually. Based on these conditions, user devices 305 may determine how to handle received messages (that are broadcasted at block 535). For instance, user devices 305 may determine whether the received messages should be displayed (or otherwise presented), or not displayed (e.g., stored without being displayed, discarded without being stored or displayed, etc.).

Figure 7:
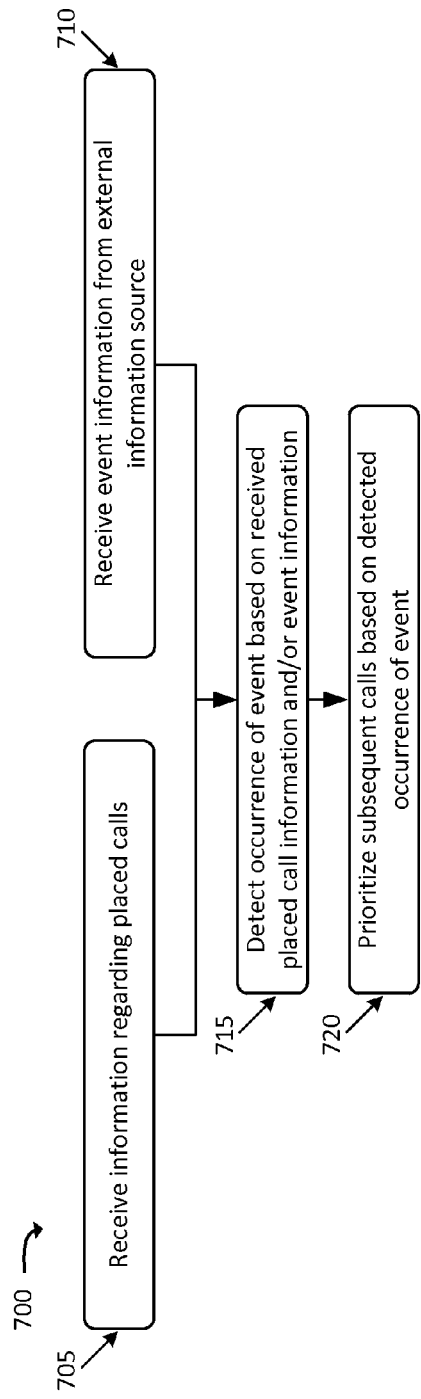
FIGS. 7 and 8 illustrate example processes for prioritizing calls based on a detected event.

FIG. 7 illustrates an example process 700 for detecting an event and prioritizing calls based on the detected event. In one example implementation, process 700 may be performed by call analysis server 345. In other implementations, some or all of process 700 may be performed by one or more other devices in lieu of, or in conjunction with, call analysis server 345. For example, some or all of process 700 may be performed by base station 310, and/or one or more components of network 340 in some implementations.

Process 700 may include receiving information regarding placed calls (block 705). Process 700 may also include receiving event information from an external information source (block 710). Process 700 may further include detecting an occurrence of an event based on the received placed call information and/or the received event information (block 715). Blocks 705-715 may be similar to blocks 505-515, respectively, as described above with respect to FIG. 5.

Process 700 may also include prioritizing subsequent calls based on the detection of the occurrence of the event (block 720). For instance, call analysis server 345 may store or output information, which may allow base stations 310 and/or one or more other devices to prioritize placed calls based on whether the calls are associated with the event. The information may indicate, for example, an identifier of a recipient (e.g., a telephone number associated with a PSAP). Network resources may be allocated more for calls that are not associated with the event, than for calls that are associated with the event. Generally, it may be desirable to prioritize calls, which are not associated with the event, over calls that are associated with the event, since it is likely that calls that are associated with the event are redundant. Process 800, described below, illustrates an example of how calls may be prioritized.

Figure 8:

FIG. 8 illustrates an example process 800 for prioritizing calls based on a detected event. In one example implementation, process 800 may be performed by base station 310. In other implementations, some or all of process 800 may be performed by one or more other devices in lieu of, or in conjunction with, base station 310. For example, some or all of process 800 may be performed by a controller of one or more base stations 310 and/or one or more components of network 340 in some implementations.

Process 800 may include receiving a call initiation request (block 805). For instance, base station 310 may receive a request, from user device 305, to initiate a voice call. The call initiation request may, in some implementations, indicate an intended recipient (e.g., a telephone number and/or another identifier).

Process 800 may also include identifying whether the call is associated with an identified event (block 810). For example, base station 310 may determine whether an intended recipient of the call is associated with an event that was previously identified (e.g., at block 715).

Process 800 may additionally include prioritizing the requested call, with respect to one or more other calls, based on whether the requested call and/or the other calls are associated with the event (block 815). For example, when concurrently handling multiple incoming call requests, base station 310 may provide higher QoS to calls that are not associated with the event than to calls that are associated with the event, placing calls that are not associated with the event ahead of calls that are associated with the event in a queue, or otherwise prioritizing calls that are not associated with the event. Additionally, or alternatively, base station 310 may assign a score or a flag to an incoming call request, and one or more other devices may perform prioritization functions based on the score or the flag.

Figure 9:
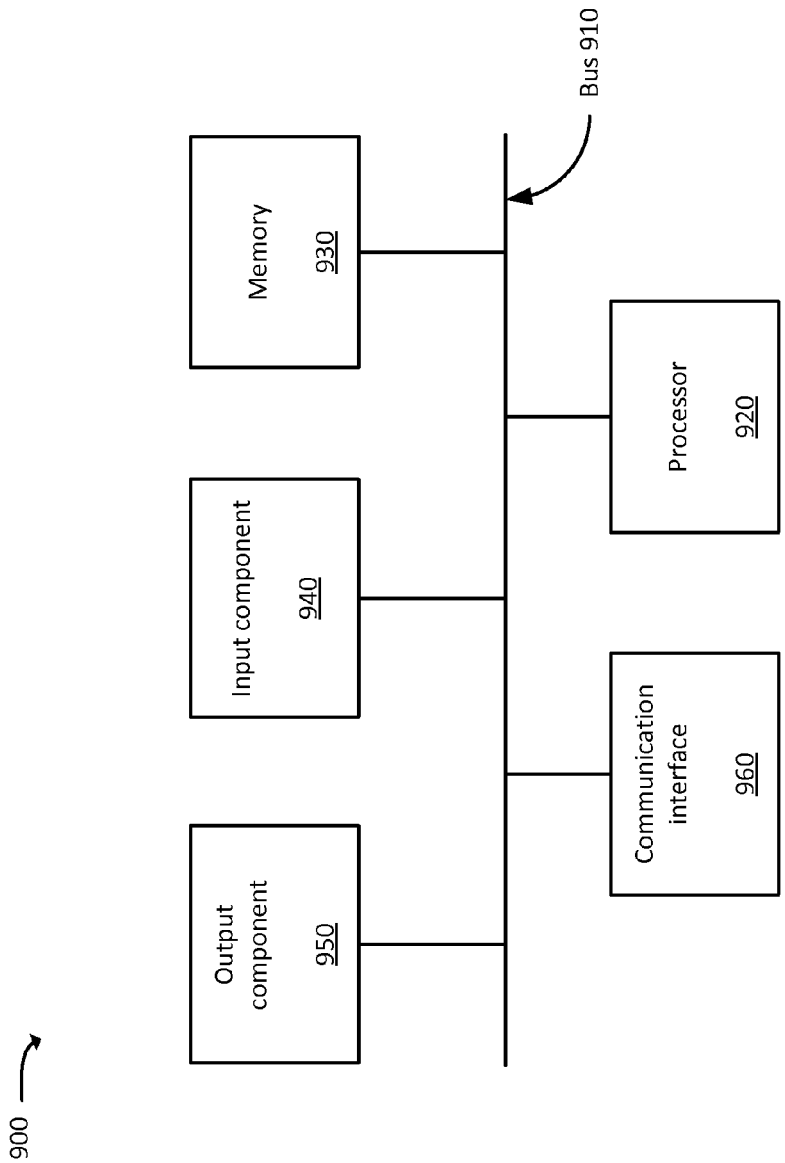
FIG. 9 illustrates example components of one or more devices, according to one or more implementations described herein.

FIG. 9 is a diagram of example components of device 900. One or more of the devices described above (e.g., with respect to FIGS. 1, 2A, 2B, 3A, 3B, and 6) may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 5, 7, and 8, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIGS. 3A and 3B), in practice, additional, fewer, or different, connections or devices may be used. For example, while a connection is not shown, in FIG. 3A, between network 340 and call priority server 355, in some implementations, network 340 may communicate either directly or indirectly with call priority server 355. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:
   receiving, by a server device, information regarding calls that have been placed;
   detecting, by the server device and based on the information regarding the calls that have been placed, an occurrence of an event associated with a particular region;
   determining, by the server device, a set of base stations that are associated with the particular region;
   broadcasting, by the server device and via the set of base stations, a message regarding the event;
   receiving, by the server device, indications regarding a plurality of calls to a particular recipient; and
   causing, by the server device, a first set of calls, of the plurality of calls, to be prioritized over a second set of calls, of the plurality of calls to the particular recipient, the first set of calls being placed by a first set of user devices located outside of the particular region, and the second set of calls being placed by a second set of user devices located within the particular region.

2. The method of claim 1, wherein broadcasting the message includes implementing at least one of:
   a Multimedia Broadcast Multicast Service ("MBMS") standard,
   an evolved MBMS ("eMBMS") standard, or
   a Cell Broadcast Service ("CBS") standard.

3. The method of claim 1, wherein the detecting includes:
   determining a quantity of calls, associated with one or more base stations of the set of base stations, that have been placed to the particular recipient;
   comparing the determined quantity of calls to a threshold quantity; and
   determining, based on the comparing, that the determined quantity exceeds the threshold quantity.

4. The method of claim 3, wherein determining the quantity of calls that have been placed to the particular recipient includes:
   determining that the quantity of calls have been placed to the particular recipient within a particular timeframe,
   wherein the threshold quantity is a quantity that is associated with the particular timeframe.

5. The method of claim 1, wherein the detecting includes:
   determining a frequency of calls, associated with one or more base stations of the set of base stations, that have been placed to the particular recipient;
   comparing the determined frequency of calls to a threshold frequency; and
   determining, based on the comparing, that the determined frequency exceeds the threshold frequency.

6. The method of claim 1, wherein the detecting includes:
   determining a quantity of calls, associated with one or more base stations of the set of base stations, that are associated with a particular topic;
   comparing the determined quantity of calls to a threshold quantity; and
   determining, based on the comparing, that the determined quantity exceeds the threshold quantity.

7. The method of claim 1, further comprising:
   prioritizing call requests, that are not associated with the event, over call requests that are associated with the event.

8. The method of claim 1, wherein prioritizing the first set of calls over the second set of calls includes:
   providing a higher level of quality of service to the first set of calls than to the second set of calls.

9. A system, comprising:
   a memory device storing a set of computer-executable instructions; and
   one or more processors configured to execute the computer-executable instructions, wherein executing the computer-executable instructions causes the one or more processors to:
     receive information regarding calls that have been placed;
     detect, based on the information regarding the calls that have been placed, an occurrence of an event;
     determine, based on the occurrence of the event, a set of user devices to which a message, regarding the event, should be broadcasted;
     broadcast the message to the set of user devices;
     receive indications regarding a plurality of calls to a particular recipient; and
     prioritize, a first set of calls, of the plurality of calls, over a second set of calls, of the plurality of calls to the particular recipient,
       the first set of calls being placed by a first set of user devices located outside of a particular region associated with the event, and
       the second set of calls being placed by a second set of user devices located within the particular region.

10. The system of claim 9, wherein executing the computer-executable instructions to broadcast the message further causes the one or more processors to implement at least one of:
    a Multimedia Broadcast Multicast Service ("MBMS") standard, or
    an evolved MBMS ("eMBMS") standard.

11. The system of claim 9, wherein executing the computer-executable instructions to detect the occurrence of the event further causes the one or more processors to:
    determine a quantity of calls, associated with one or more base stations, that have been placed to the particular recipient;
    compare the determined quantity of calls to a threshold quantity, wherein the threshold quantity is based on the quantity of one or more base stations; and
    determine, based on the comparing, that the determined quantity exceeds the threshold quantity.

12. The system of claim 11, wherein executing the computer-executable instructions to determine the quantity of calls that have been placed to the particular recipient further causes the one or more processors to:
    determine that the quantity of calls have been placed to the particular recipient within a particular timeframe,
    wherein the threshold quantity is a quantity that is associated with the particular timeframe.

13. The system of claim 9, wherein executing the computer-executable instructions to detect the occurrence of the event further causes the one or more processors to:
    determine a frequency of calls that have been placed to the particular recipient;

compare the determined frequency of calls to a threshold frequency; and determine, based on the comparing, that the determined frequency exceeds the threshold frequency.

14. The system of claim 9, wherein executing the computer-executable instructions to detect the occurrence of the event further causes the one or more processors to:

determine a quantity of calls that are associated with a particular topic;

compare the determined quantity of calls to a threshold quantity; and determine, based on the comparing, that the determined quantity exceeds the threshold frequency.

15. The system of claim 9, wherein executing the computer-executable instructions further causes the one or more processors to:

assign a score to incoming call requests, the score assigned to a particular incoming call request being based on whether the particular incoming call request is associated with the event.

16. The system of claim 15, wherein executing the computer-executable instructions to detect the occurrence of the event further causes the one or more processors to:

detect the occurrence of the event based on calls that have been placed to the particular recipient, wherein incoming call requests that are associated with the event are call requests for calls to the particular recipient, and wherein incoming call requests that are not associated with the event are not call requests for calls to the particular recipient.

17. A computer-readable medium, comprising:

a plurality of computer-executable instructions stored thereon, which when executed by one or more processors of a server device, cause the one or more processors to:

receive information regarding calls that have been placed;

detect, based on the information regarding the calls that have been placed, an occurrence of an event;

determine, based on the occurrence of the event, a set of user devices to which a message, regarding the event, should be broadcasted; and broadcast the message to the set of user devices;

receive indications regarding a plurality of calls to a particular recipient; and prioritize, a first set of calls, of the plurality of calls, over a second set of calls, of the plurality of calls to the particular recipient, the first set of calls being placed by a first set of user devices located outside of a particular region associated with the event, and the second set of calls being placed by a second set of user devices located within the particular region.

18. The computer-readable medium of claim 17, wherein the computer-executable instructions to detect the occurrence of the event include instructions that cause the one or more processors to:

determine a quantity of calls, associated with one or more base stations, that have been placed to the particular recipient;

compare the determined quantity of calls to a threshold quantity, wherein the threshold quantity is based on the quantity of one or more base stations; and determine, based on the comparing, that the determined quantity exceeds the threshold quantity.

19. The computer-readable medium of claim 17, wherein the computer-executable instructions to detect the occurrence of the event include instructions that cause the one or more processors to:

determine a frequency of calls that have been placed to the particular recipient;

compare the determined frequency of calls to a threshold frequency; and determine, based on the comparing, that the determined frequency exceeds the threshold frequency.

20. The computer-readable medium of claim 17, wherein the computer-executable instructions further cause the one or more processors to:

determine locations from which the calls have been placed;

wherein the computer-executable instructions, to detect the occurrence of the event include instructions, cause the one or more processors to:

detect, based on the determined locations, that at least a threshold quantity or frequency of calls have been received from within the particular region.

* * * * *